United States Patent Office 2,822,378
Patented Feb. 4, 1958

2,822,378

METHOD FOR PREPARING ESTERS

Alfred R. Bader, Milwaukee, Wis., assignor to Pittsburgh Plate Glass Company, Allegheny County, Pa., a corporation of Pennsylvania No Drawing. Application April 23, 1953
Serial No. 350,747

3 Claims. (Cl. 260—474)

This invention relates to the preparation of esters of phenolic compounds and it has particular relation to the preparation of esters of phenolic compounds and carboxylic acids.

It has heretofore been proposed to prepare esters of phenols and carboxylic acids by reacting a phenol and an acyl chloride or acid anhydride. This reaction with an acyl chloride is not very satisfactory inasmuch as it results in the liberation of much hydrogen chloride. Additionally, the acid chloride and anhydride are difficult to prepare.

It has also been proposed to effect esterification reaction between phenols and carboxylic acids in the presence of phosphorus oxychloride. The reaction again is decidedly unsatisfactory, since various objectionable side reactions may occur, thus greatly reducing the efficiency of the process.

Certain other esters of phenols and carboxylic acids have also been prepared by complicated methods. For example, Filachione et al., in the Journal of the American Chemical Society, 72, page 839, 1950, describes the prepartion of phenyl methacrylate by a reaction involving acetylation of lactic acid, conversion of the resulting acetoxy propionic acid into its acid chloride, reaction of the latter with phenol and finally pyrolizing the product at 525° C.

The usual and more conventional catalysts of esterification such as sulfuric acid, hydrochloric acid or the like are not effective to produce esterification of phenols and carboxylic acids.

It has now been discovered that estification reactions between phenols and carboxylic acids can be successfully brought about by the use of polyphosphoric acid as a reaction catalyst. This reaction proceeds very smoothly with the formation of but little or no by-products.

Polyphosphoric acid may be regarded as comprising a reaction product of or a solution of orthophophoric acid ($H_3PO_4$) and phosphorus pentoxide ($P_2O_5$). This acid is termed "a condensed phosphoric acid" and its formula is understood to be:

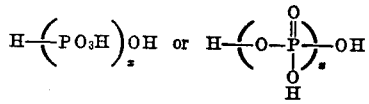

where $x$ is greater than 1. It is an easily handled and relatively inexpensive viscous liquid. It is understood to contain about 82 to 84 or 85 percent of $P_2O_5$.

In the performance of the esterification between phenols and carboxylic acids, polyphosphoric acid may be employed as a promoter in a wide range of proportions. Usually, it is preferred to utilize it in an amount in excess of 10 percent by weight based upon the reaction components and the upper limits are imposed by economics rather than by chemical behavior. Obviously, great excesses beyond those required to obtain reaction merely increase the costs without corresponding improvements in results. A range of about 5 to 40 or even 100 percent by weight based upon the reaction mixture is suggested as being near the optimum requirement of polyphosphoric acid. The polyphosphoric acid may act as a dehydrating agent and absorb the water evolved in the reaction.

The esterification reaction of phenols and carboxylic acids which may be promoted by polyphosphoric acid in accordance with the provisions of this invention is of relatively general nature. That is, compounds containing the carboxylic acid group will, in most instances, react with aromatic compounds containing one or more hydroxyl groups directly joined to an aromatic nucleus to form esters. Naturally, the several components of the system must be selected with a view of obtaining mutual compatibility and solubility which can readily be accomplished by simple solubility tests. Also, the phenolic compound and the carboxylic acid should be selected with a view of excluding unwanted side reactions which, in some instances, might occur because of the presence of overly active groups in side chains or linkages. Naturally, all pairs of phenols and carboxylic acids do not react with equal ease and efficiency. A few of the possible carboxylic acids (or anhydrides thereof) and phenols which in the presence of polyphosphoric acid can be caused to interact to form esters are listed below in Table A. It will be understood that the positions of the acids and the phenols have no significance as to permissible grouping or pairing thereof.

TABLE A

| Phenols | Carboxylic acids |
|---|---|
| Monohydric phenols such as: phenol; | Monocarboxylic acids such as formic, acetic, chloroacetic, propionic, butyric, stearic, oleic, linoleic, elaeostearic, methacrylic, acrylic, angelic acids; |
| Alkylated phenols as: cresols (all isomers), xylenols, butylphenol, amylphenol, thymol, carvacrol; | |
| Halogenated phenols such as: mono, di, tri, tetra, and penta-chlorophenol. (The several isomers such as para, meta and ortho chlorophenol are included); | Gamma or delta-keto acids such as levulinic acid, gamma-acetobutyric acid; Polycarboxylic acids as phthalic, chlorophthalic, succinic, adipic, sebacic, azelaic, oxalic acids, citric acid, tartaric acid, carlic acid; |
| Phenol ethers such as: guaiacol, 2,5-dimethoxyphenol; | Unsaturated dicarboxylic acids as maleic, itaconic or the like. |
| Phenols containing a plurality of phenolic hydroxy groups such as: catechol, resorcinol, hydroquinone, pyrogallol; | |
| Substituted derivatives of phenols containing a plurality of phenolic hydroxyls such as: bis-(4-hydroxyphenyl)-2,2-propane, bis-(4-hydroxyphenyl)-1,1-ethane, or the like. | |

Acid anhydrides of the acids listed above also react with phenolic compounds in the presence of polyphosphoric acid to yield esters and the term "acid" is, therefore, intended to include the corresponding anhydride.

In conducting the esterification reaction between the phenols and the carboxylic acids in the presence of polyphosphoric acid, the reactants may be mixed in mass without solvents. They may also be mixed in nonreacting solvents such as toluene, benzene, xylene or the like. The invention further includes emulsification of the reactants through the use of emulsifying agents.

In conducting the reaction, it is, in many instances, sufficient merely to mix the phenolic compound, the carboxylic acid and the polyphosphoric acid in a flask, beaker, kettle or any other appropriate container and then to bring the mixture to reaction temperature, ordinarily about 20° C. to 150° C., upon a steam-bath or other appropriate heating device. The apparatus preferably should include an agitator in order to attain thorough mixing of the several constituents.

The course of the reaction need not be followed with any particular care since the prolonged heating of the mixture at steam-bath or water-bath temperatures usually is not harmful. In laboratory operations, it is sufficient to leave the mixture stir for some period of time at reaction temperature, for example, overnight or for a day or two.

The application of the principles of the invention to the preparation of particular esters of phenols and carboxylic acid are illustrated by the following examples:

*Example I*

In this example phenol and acetic acid were smoothly reacted in the presence of polyphosphoric acid to provide phenyl acetate. The procedure involving mixing 94 grams of phenol (1 mole), 120 grams (2 moles) of glacial acetic acid and 50 grams of polyphosphoric acid. The mixture was heated on a steam-bath with agitation overnight. The product was diluted with water, extracted with toluene and washed with 10 percent aqueous sodium hydroxide solution and water. The product remaining comprised phenyl acetate which distilled at 92 to 94° C. at a pressure of 20 millimeters (absolute). No residue remained in the flask. The product had a saponification value of 302 and a refractive index of 1.5117.

*Example II*

In this example, the ester of levulinic acid and phenol was prepared. In conducting the reaction, a mixture of 94 grams of phenol, 58 grams of levulinic acid and 50 grams of polyphosphoric acid were stirred at steam-bath temperature for 16 hours. The mixture was cooled and poured into hot water. A dark oil, heavier than water, separated and was washed twice with hot water and then stripped. The mixture was subjected to distillation under vacuum. The fraction distilling within the range of 50 to 120° C. at 0.7 millimeters pressure first came over and was found to consist primarily of unreacted phenol. A water-white liquid having a boiling range of 120 to 130° C. at 0.5 millimeter of pressure (absolute) then came over. This product crystallized upon cooling and was found to have a melting point of 29° to 30° C. The product was phenyl levulinate. Additional water-white oil distilled over at a temperature of 130° to 150° C. at 0.8 millimeter pressure (absolute). The phenol levulinate as thus obtained agreed closely in carbon and hydrogen content with the theoretical value and the saponification value obtained likewise was very close to that calculated. The material crystallized from methanol as hard, white crystals which melted sharply at 32° C.

Both the product and the method of preparing the same are novel.

*Example III*

In this example, phenol was esterified with maleic acid in the presence of polyphosphoric acid. In conducting the reaction, 98 grams of maleic anhydride (1 mole), 376 grams (5 moles) of phenol, and 100 grams of polyphosphoric acid were stirred and heated on the steam bath for 20 hours. The product was then cooled and poured into cold water, extracted with toluene and the toluene solution was further extracted with 2 liters of 10 percent aqueous sodium hydroxide, washed with water and stripped. The product was crystalline and on recrystallization from toluene and heptane melted at 71–72° C. Elementary carbon and hydrogen analyses agreed well with the theoretical values for diphenyl maleate of the formula

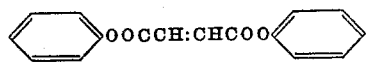

This is a novel product.

*Example IV*

In this example, phenyl benzoate of the formula

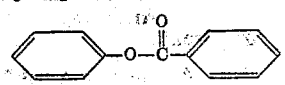

was prepared. In the preparation, 100 grams of benzoic acid, 200 grams of phenol, and 100 grams of polyphosphoric acid were mixed and stirred on the steam bath for 16 hours. The mixture was then cooled and water was added. The resultant solution was extracted with toluene and the toluene solution was extracted with 10 percent aqueous caustic soda and finally was washed with water and stripped. The product was a faintly yellow, crystalline material which, upon distillation, provided beautiful, hard, white crystals of phenol benzoate melting at 70 to 71° C.

*Example V*

In a manner similar to that of the previous example, the phenyl ester of methacrylic acid may be prepared by heating a mixture of phenol, methacrylic acid, and polyphosphoric acid on a steam-bath for an appropriate period of time, e. g. 10 to 20 hours. The product as obtained by this method is a beautifully crystalline solid melting at 17° C. and having a refractive index of 1.5150. As set forth hereinabove, phenyl methacrylate was previously prepared by a complicated method by Filachione et al., and was described by them as being a colorless liquid which could be mixed with benzoyl peroxide and polymerized at 65° C. to provide clear castings.

*Example VI*

The previously described method is also very satisfactory for the preparation of diphenyl phthalate which has heretofore been prepared by another method and which is valuable as a plasticizer for various resins and plastics. For example, a mixture of phthalic acid or phthalic anhydride and 1 or more molar equivalencies of phenol may be mixed with 5 to 100 percent by weight based upon the esterifiable mixture of polyphosphoric acid. The mixture is heated on a steam-bath as previously described to provide diphenyl phthalate. This can be purified by washing it with caustic, extracting with toluene, and utilizing the other techniques which have been described in Examples I through IV.

*Example VII*

This example illustrates the preparation of an ester of a bisphenol compound, namely, the ester of the diphenol of the formula

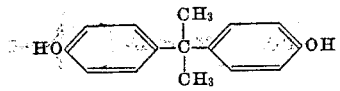

and a dicarboxylic acid, namely, azelaic acid. The azelaic acid should be mixed with a molecular equivalency or preferably with an excess of the diphenol and the mixture then further incorporated with 20 to 40 percent or more of polyphosphoric acid. The reaction mixture is then heated at 80–120° C. for a number of hours, e. g., for 10 to 20 hours. This reaction could be continued to provide a resinous product.

*Example VIII*

Fifty grams of diglycolic acid, 150 grams of phenol, and 100 grams of polyphosphoric acid were heated at 95° C. with stirring for 16 hours. Diphenyl diglycolate was then isolated as in the examples above. Crystallization from a mixture of toluene and heptane yielded shiny, white platelets of the ester, melting at 73°–75° C.

The present invention includes the reaction of mono and polyhydric phenols such as phenol or hydroquinone with alkyd polyesters such as may be obtained by reacting the phenol with a polyester such as glyceryl phthalate or glycol maleate. In such reaction, it is preferred that the polyester be of relatively high acid value, in order to provide an adequate number of available carboxyls. The phenol may be employed in an amount in excess of that theoretically required.

*Example IX*

The process of this invention provides a simple and convenient method of preparing the commercial product known as Salol, which is phenyl salicylate. This has previously been prepared by the reaction of phenol and salicylic acid in the presence of phosphorous oxychloride ($POCl_3$).

In acordance with this invention, 1.6 gram mole of phenol and 0.4 gram moles of salicylic acid are heated with 50 grams of polyphosphoric acid at a temperature of 90° C. The product (Salol) is purified by the techniques previously described.

The esters obtained by the method of this invention, particularly the phenyl esters, are valuable compounds. For example, they are useful plasticizers for synthetic resins and rubbers, as ingredients of perfumes, and as intermediates in the preparation of resins, as well as being useful for many other purposes.

The forms of the invention herein shown and described are to be considered as being by way of illustration. It will be apparent to those skilled in the art that numerous modifications may be made therein without departure from the spirit and scope of the appended claims.

I claim:

1. The method of preparing esters of a phenol and a carboxylic acid which comprises mixing the phenol and the carboxylic acid with about 10 to 100 percent, based upon the esterifiable mixture, of free liquid polyphosphoric acid and heating the mixture to esterification temperature whereby to obtain said ester.

2. A method of preparing phenylacetate which comprises mixing phenol with anhydrous acetic acid and about 10 to 100 percent, based upon the esterifiable mixture, of free liquid polyphosphoric acid and heating the mixture to esterification temperature to obtain said ester.

3. The method of claim 1 in which the acid is of a class consisting of maleic acid, levulinic acid, benzoic acid, salicylic acid and methacrylic acid.

References Cited in the file of this patent

UNITED STATES PATENTS

| | | |
|---|---|---|
| 948,084 | Ach | Feb. 1, 1910 |
| 2,422,016 | Hull et al. | June 10, 1947 |
| 2,477,327 | Blake | July 26, 1949 |
| 2,496,791 | Hagemeyer | Feb. 7, 1950 |
| 2,575,457 | Mavity | Nov. 20, 1951 |
| 2,586,852 | Morrell | Feb. 26, 1952 |
| 2,647,921 | Patrick | Aug. 4, 1953 |

OTHER REFERENCES

Groggins: "Unit Processes in Organic Synthesis" (1952), pp. 602–611.

U. S. DEPARTMENT OF COMMERCE
PATENT OFFICE

CERTIFICATE OF CORRECTION

Patent No. 2,822,378      Alfred R. Bader      February 4, 1958

It is hereby certified that error appears in the printed specification of the above numbered patent requiring correction and that the said Letters Patent should read as corrected below.

Column 1, line 36, for "prepartion" read -- preparation --; line 51, for "orthophophoric" read -- orthophosphoric --; column 4, line 23, for "phenol" read -- phenyl --.

Signed and sealed this 17th day of June 1958.

(SEAL)
Attest:

KARL H. AXLINE
Attesting Officer

ROBERT C. WATSON
Commissioner of Patents